United States Patent

Hampo et al.

[11] Patent Number: 5,754,026
[45] Date of Patent: May 19, 1998

[54] INDUCTION MOTOR CONTROL METHOD

[75] Inventors: Richard Joseph Hampo, Livonia; Md Abul Masrur, West Bloomfield; John Michael Miller, Saline, all of Mich.

[73] Assignee: Ford Global Technologies, Inc., Dearborn, Mich.

[21] Appl. No.: 825,986

[22] Filed: Apr. 4, 1997

[51] Int. Cl.$^6$ .................................................. H02B 5/34
[52] U.S. Cl. ........................ 318/802; 318/805; 318/713
[58] Field of Search ................................ 318/798–814, 318/821–823, 825–828, 713–719

[56] References Cited

U.S. PATENT DOCUMENTS

| | | |
|---|---|---|
| 4,418,308 | 11/1983 | Bose . |
| 4,453,116 | 6/1984 | Bose . |
| 4,672,288 | 6/1987 | Abbondanti . |
| 4,752,725 | 6/1988 | Ominato ................ 318/807 |
| 4,757,248 | 7/1988 | Fujioka et al. . |
| 4,792,742 | 12/1988 | Fujimoto et al. . |
| 4,918,367 | 4/1990 | Pohjalainen . |
| 5,278,485 | 1/1994 | Kim ........................ 318/802 |
| 5,278,486 | 1/1994 | Kim ........................ 318/811 |
| 5,399,952 | 3/1995 | van Alem et al. . |
| 5,481,173 | 1/1996 | Yamamoto ............... 318/801 |
| 5,532,570 | 7/1996 | Tajima et al. ............ 318/809 |
| 5,532,571 | 7/1996 | Masaki et al. ........... 318/809 |
| 5,659,235 | 8/1997 | Yamada et al. .......... 318/801 |

*Primary Examiner*—Brian Sircus
*Attorney, Agent, or Firm*—Mark S. Sparschu

[57] ABSTRACT

The present invention provides a method for controlling an induction motor. The method comprises determining an input impedance of the motor at an operating point; determining an input electrical power to the motor at the operating point; and estimating a slip or shaft speed of the motor at the operating point from the input impedance and input electrical power.

11 Claims, 1 Drawing Sheet

INDUCTION MOTOR CONTROL METHOD

BACKGROUND OF THE INVENTION

1. Field of the Invention

The present invention relates to induction motor control.

2. Description of the Related Art

Several methods are known for the torque control of induction motors. One of the most common is field-oriented control. Field-oriented control, however, generally requires two phase current sensors (in the case of a three-phase motor) and a motor shaft position or speed sensor. This sensor set is somewhat expensive, and the shaft position or speed sensor may be somewhat unreliable. Field-oriented control is also fairly computation-intensive.

Where the demands of the control application do not require field-oriented control, scalar control can be used. Scalar control is a steady-state control method which requires less computation than field-oriented control. However, scalar torque control generally still requires a shaft position or speed sensor and two current sensors.

Therefore, an induction motor control method with the three advantages of not needing a shaft position or speed sensor, requiring fewer computational operations, and in some cases, needing only a single current sensor will be more desirable than existing scalar torque control methods.

SUMMARY OF THE INVENTION

The present invention provides a method for controlling an induction motor. The method comprises determining an input impedance of said motor at an operating point. The method additionally includes determining an input electrical power to said motor at the operating point. Further, the method comprises estimating a slip or shaft speed of the motor at the operating point from the input impedance and input electrical power.

The present invention enables induction motor control without the use of a motor shaft speed or position sensor. Further, the control can be accomplished with fewer computational requirements than some other methods of motor control. In some applications, motor control according to the present invention can further be performed with only one motor phase current sensor. For these reasons, the present invention can provide advantages of reduced cost, reduced complexity and improved reliability compared to other scalar torque control methods.

DETAILED DETAILED OF THE PREFERRED EMBODIMENT

Figure 1:
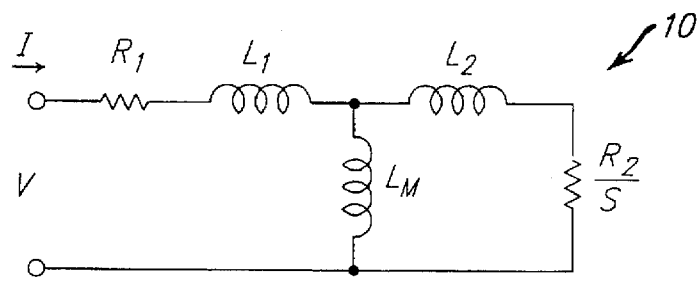
FIG. 1 is a per-phase equivalent circuit of an induction motor 10.

Refer first to FIG. 1. Illustrated there is a steady-state per-phase equivalent circuit of an induction motor 10. The equivalent circuit of motor 10 includes a stator resistance $R_1$ and a stator leakage inductance $L_1$. The equivalent circuit further includes a rotor resistance $R_2$ and a rotor leakage inductance $L_2$. $L_m$ is the mutual inductance between the stator and the rotor. Though capturing the complete transient behavior of motor 10 requires a more complex model than that of FIG. 1, the steady state model shown there is fully adequate for some applications where extremely high torque control bandwidth is not required.

Figure 2:
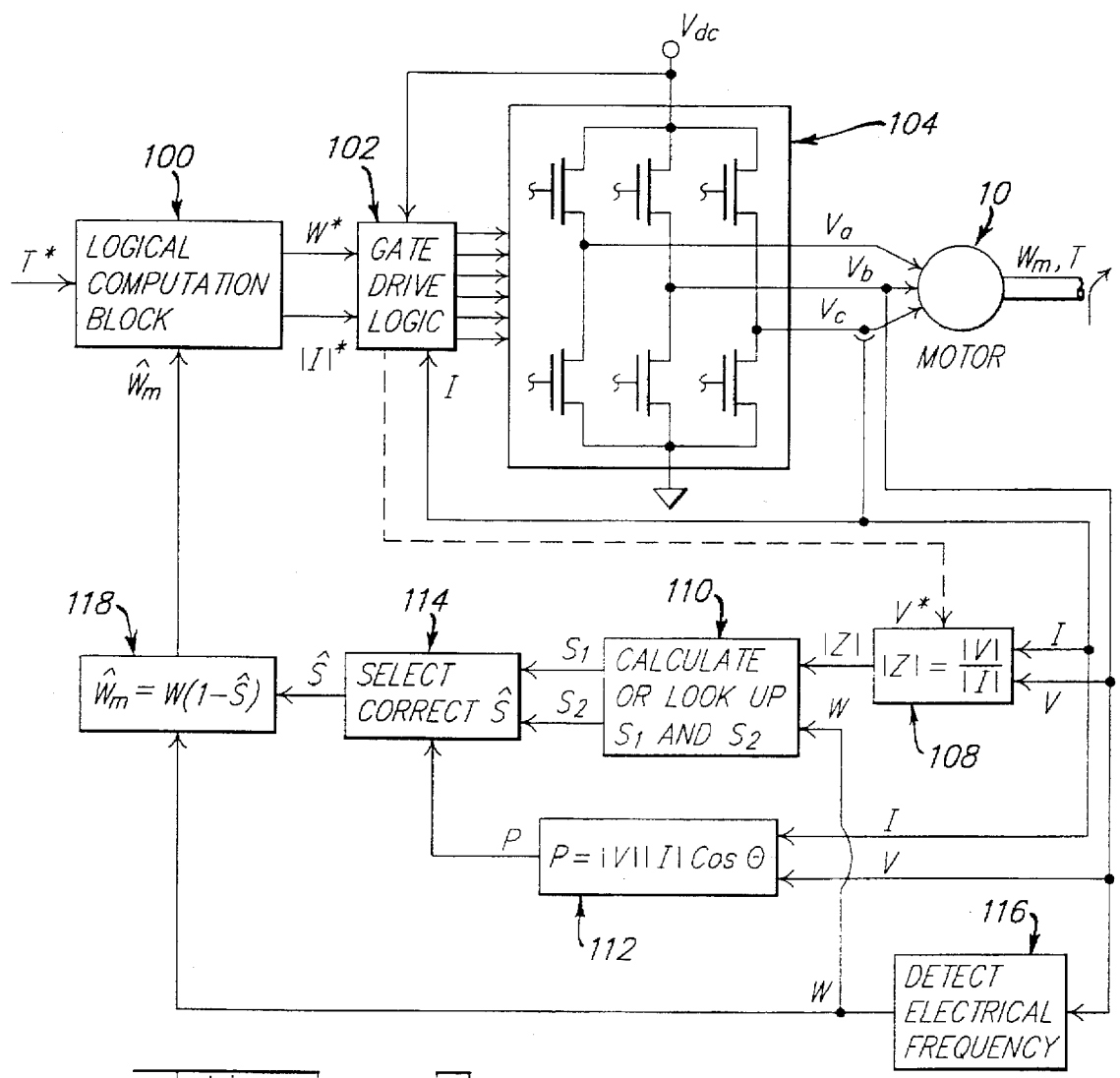
FIG. 2 is a block diagram of a system and method for controlling induction motor 10 according to one embodiment of the present invention.

A system for controlling motor 10 in accordance with one embodiment of the present invention is shown with additional reference to FIG. 2. At block 100, a commanded torque T* is used to determine the appropriate commanded electrical frequency $\omega^*$ and rms current $|I|^*$ to be applied to motor 10. Block 100 uses the following equation for output torque of an induction motor:

$$T = \frac{3pL_m^2 I^2}{\frac{r_2}{\omega - \omega_m} + (L_m + L_2)^2 \frac{\omega - \omega_m}{r_2}} \quad (1)$$

where p is the number of poles of motor 10, $\omega$ is the electrical frequency of the power applied to motor 10, $\omega_m$ is the mechanical shaft speed of motor 10 and the remaining variables have been defined above. From Equation (1), $$\omega = \omega_m + \frac{3pI^2 L_m^2 r_2 \pm \sqrt{(3pI^2 L_m^2 r_2)^2 - 4(L_m + L_2)^2 T^2 r_2^2}}{2(L_m + L_2)^2 T} \quad (2)$$

Selecting $$(3pI^2 L_m^2 r_2)^2 = 4(L_m + L_2)^2 T^2 r_2^2 \quad (3)$$

achieves the maximum torque for a given current I, and is thus desirable for efficiency reasons. Thus, $$\omega = \omega_m + \frac{3pI^2 L_m^2 r_2}{2(L_m + L_r)^2 T} \quad (4)$$

Equation (3) can be uniquely solved for the commanded current magnitude. Assuming that an estimate of $\omega_m$ is available, once the desired current magnitude is known, Equation (4) can then be solved for the commanded electrical frequency $\omega^*$. The method for estimating $\omega_m$ will be developed below.

At block 102, gate drive logic generates the commanded electrical frequency $\omega^*$ and commanded rms current $|I|^*$ via inverter 104. Implementations of gate drive logic block 102 and inverter block 104 are common in the art of induction motor control and will not be described further here. The outputs of inverter 104 are phase voltages $V_a$, $V_b$ and $V_c$ to motor 10. Motor 10 operates at a shaft speed $\omega_m$ and generates a torque T. In one illustrative application, motor 10 could be used in an electrical power steering system. In such an application, $\omega_m$ is imposed on motor 10 by the vehicle's driver turning the steering wheel. Torque T* commanded to motor 10 is an appropriate level of power assist for the particular driving conditions at hand.

As was discussed above, an estimate $\hat{\omega}_m$ of shaft speed $\omega_m$ of motor 10 is used at block 100. The generation of this estimate will now be discussed. Based on the equivalent circuit of motor 10 shown in FIG. 1, the input impedance Z at the terminals of motor 10 is $$Z = \frac{\frac{r_1 r_2}{s} + \frac{j\omega L_1 r_2}{s} + j\omega(L_m + L_2)r_1 - \omega^2 L_1(L_m + L_2) - \omega^2 L_m L_2 + \frac{j\omega L_m r_2}{s}}{\frac{r_2}{s} + j\omega(L_m + L_2)} \quad (5)$$

All the machine parameters in Equation (5) are known from the design of motor 10, $\omega$ is known because it is commanded, and Z can be measured. Thus, Equation (5) can be solved for a slip estimate $\hat{s}$, which, with $\omega$, allows an estimate $\hat{\omega}_m$ of shaft speed $\omega_m$ to be readily calculated. However, Equation (5) is quadratic, so two candidates for slip estimate $\hat{s}$ can result from any given impedance Z.

Thus, a second equation is needed to determine the slip estimate $\hat{s}$. The second equation is derived from the knowledge that:

$$P = |V||I|\cos\theta. \quad (6)$$

That is, input electrical power to motor 10 is a measurable quantity using measured rms voltage, rms current and the cosine of the angle between the voltage and current vectors (i.e., the power factor). Input power P is also a function of electrical frequency ω and slip s, the relationship being as follows:

$$P = |V||I|\cos\left\{\arctan\left(\frac{s^2\omega^3(L_m+L_2)(L_mL_2+L_mL_1+L_1L_2) + \omega r_2^2(L_1+L_m)}{s^2\omega^2(L_m+L_2)^2 r_1 + s\omega^2 L_m^2 r_2 + r_1 r_2^2}\right)\right\} \quad (7)$$

Thus, given a measured power P and a known electrical frequency ω, Equation (7) will yield two candidates for the slip estimate ŝ. The common candidate for estimated slip which meets both Equations (5) and (7) can be selected as the slip estimate ŝ. Thus, from Equations (5) and (7), slip estimate ŝ can be uniquely determined.

Return to the block diagram of FIG. 2. At block 108, the magnitude |Z| of the input impedance of motor 10 is calculated. Measurement of phase voltage V is not strictly necessary because phase voltage V and be reliably estimated from the phase voltage command V* internal to gate drive logic 108. Either the peak or rms values of V and I can be used to calculate |Z|. At step 110, the two possible slip values, $s_1$ and $s_2$, are determined from |Z|. This can be done either by directly applying Equation (5) or by using a three-dimensional look-up table with |Z| and ω as independent variables and the pair ($s_1$, $s_2$) as dependent variables.

At block 112, the input power P is calculated as |V| |I| cos θ. This input power P is then used at block 114 to generate candidates for the estimated slip using Equation (7) or a look-up table embodying the relationship of Equation (7). The common candidate for estimated slip between the values generated from Equations (5) and (7) is selected as the estimated slip ŝ.

At block 116, a frequency detector determines the electrical frequency ω of the signals applied to motor 10. This is a conceptual block only; since the frequency is commanded, it need not be measured. At block 118, an estimate $\hat{\omega}_m$ of shaft speed of motor 10 is calculated from the well-known relationship $$\omega_m = \omega(1-S). \quad (8)$$

The estimate $\hat{\omega}_m$ of shaft speed is then provided to block 100.

As was detailed above in connection with Equation (3), a "maximum torque per ampere" strategy can be employed to select electrical frequency ω. There may also be advantages to placing additional restrictions on ω. For example, a minimum bound might be placed on ω. This minimum bound will define how long the calculations of |Z| and P will take, because enough of the cycle of current I must occur before its rms or peak value can be determined. To achieve a given torque control bandwidth, an appropriate minimum value of ω can be selected.

Further, a maximum value of ω can be selected so that computational requirements for performing the various calculations detailed herein are reasonable. Also, the electrical losses in the system will be higher at higher frequencies.

Although the system of FIG. 2 is very cost effective in only using one current sensor, the torque control bandwidth can be increased (if desired) by adding a second current sensor. Such a current sensor would measure the current on a second of motor 10's phases. In such a case, the rms current can be immediately calculated without waiting for a cycle to elapse because the length of the stator current vector can be calculated instantaneously. The torque control can thus be performed more quickly.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for controlling an induction motor, said method comprising:
    determining an input impedance of said motor at an operating point;
    determining an input electrical power to said motor at said operating point; and
    estimating a slip of said motor at said operating point from said input impedance and input electrical power.

2. A method as recited in claim 1, wherein determining an input impedance and determining an input electrical power each include using measured electrical current data from exactly one of said motor's phases.

3. A method as recited in claim 1, wherein:
    determining an input impedance and determining an input electrical power each include using measured electrical current data from two of said motor's phases.

4. A method as recited in claim 1, wherein:
    said motor is a three-phase motor; and
    determining an input impedance and determining an input electrical power each include using measured electrical current data from exactly two of said motor's phases.

5. A method as recited in claim 1, further comprising:
    estimating a shaft speed of said motor using said slip estimate;
    determining a commanded current and a commanded electrical speed of said motor using said estimated shaft speed and a commanded torque.

6. A method as recited in claim 1, further comprising:
    determining a commanded current and a commanded electrical speed of said motor using said estimated slip and a commanded torque.

7. A method for controlling an induction motor, said method comprising:
    determining an input impedance of said motor at an operating point;
    determining an input electrical power to said motor at said operating point; and
    estimating a shaft speed of said motor at said operating point from said input impedance and input electrical power.

8. A method as recited in claim 7, wherein determining an input impedance and determining an input electrical power each include using measured electrical current data from exactly one of said motor's phases.

9. A method as recited in claim 7, wherein determining an input impedance and determining an input electrical power each include using measured electrical current data from two of said motor's phases.

10. A method as recited in claim 7, wherein:
    said motor is a three-phase motor; and
    determining an input impedance and determining an input electrical power each include using measured electrical current data from exactly two of said motor's phases.

11. A method as recited in claim 7, further comprising:
    estimating a shaft speed of said motor using said slip estimate;
    determining a commanded current and a commanded electrical speed of said motor using said estimated shaft speed and a commanded torque.

* * * * *